३,४५४,१७२
Patented July 8, 1969

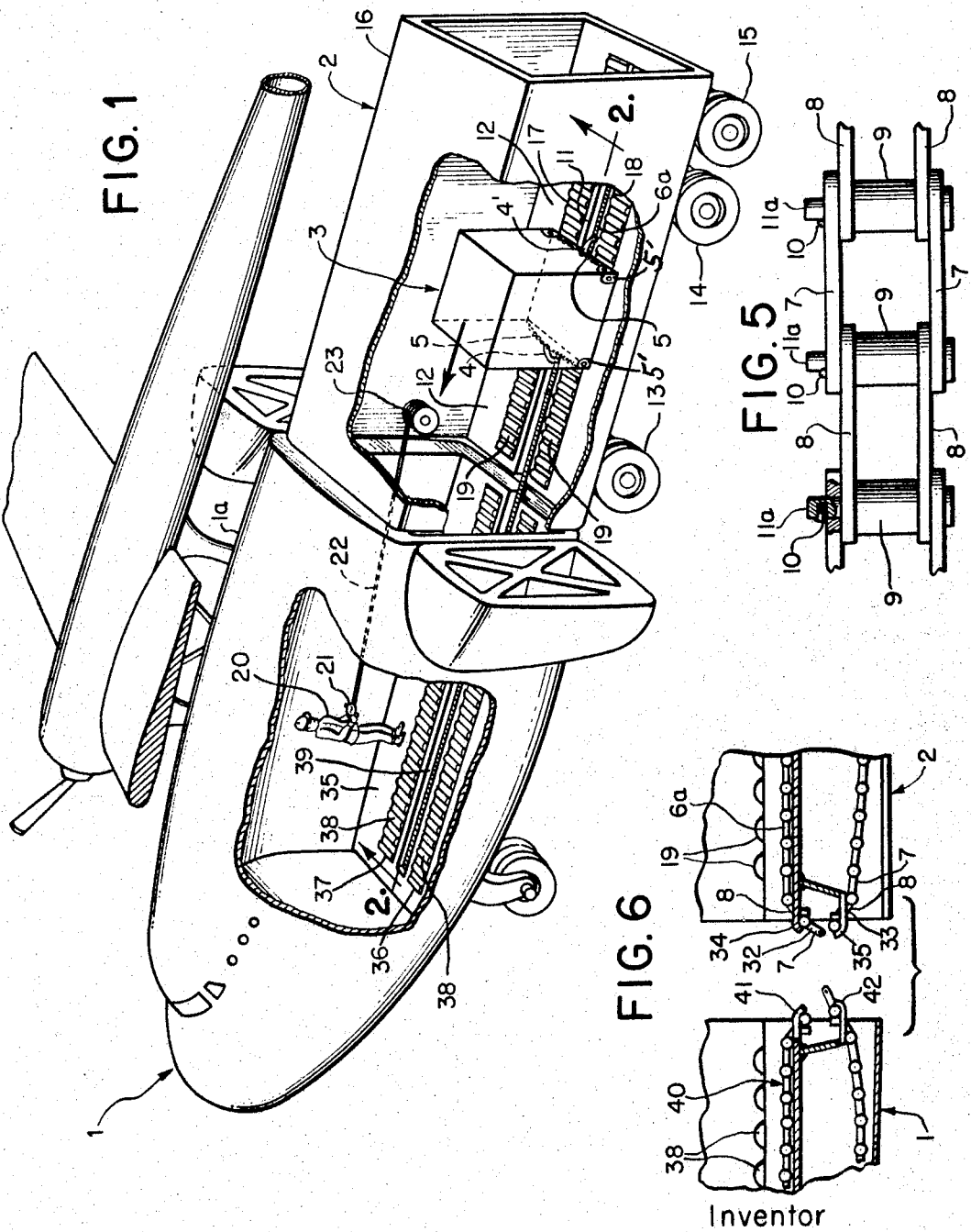

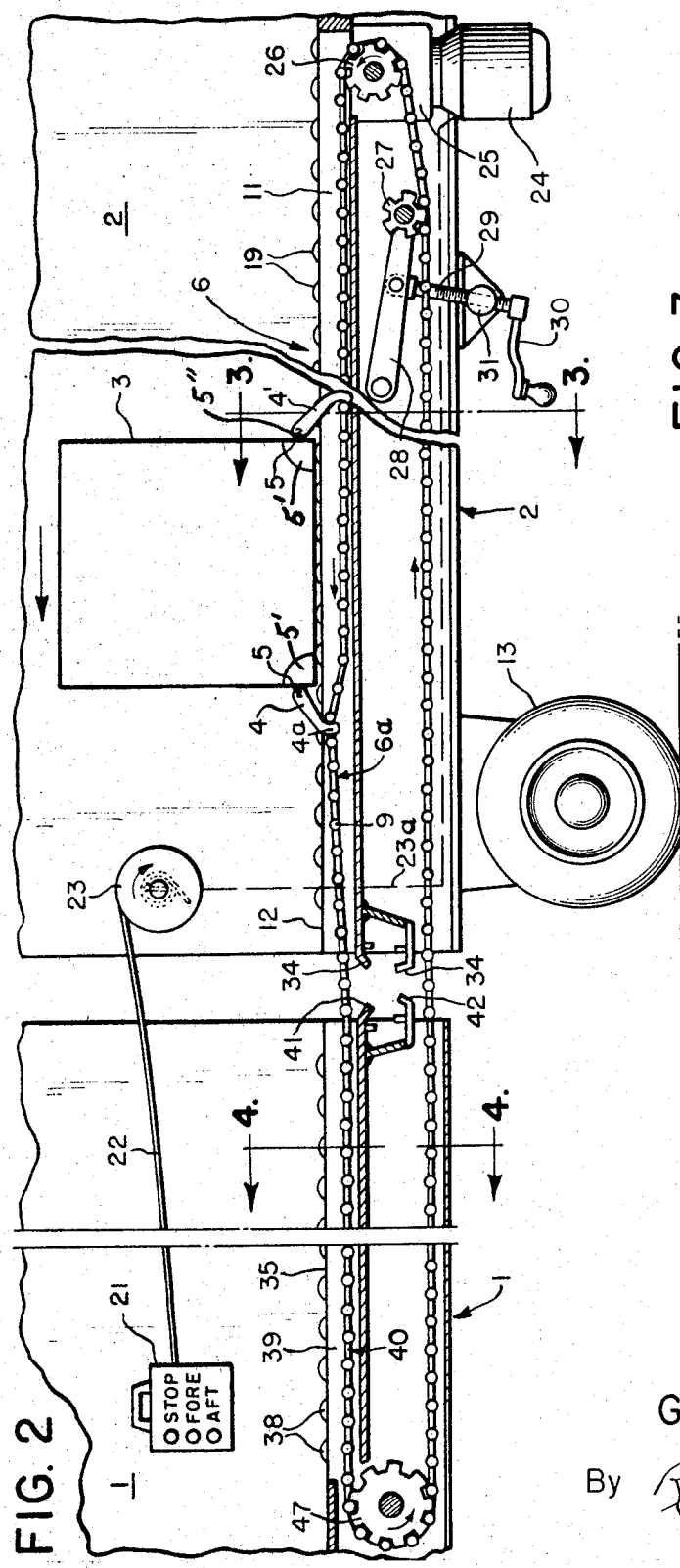
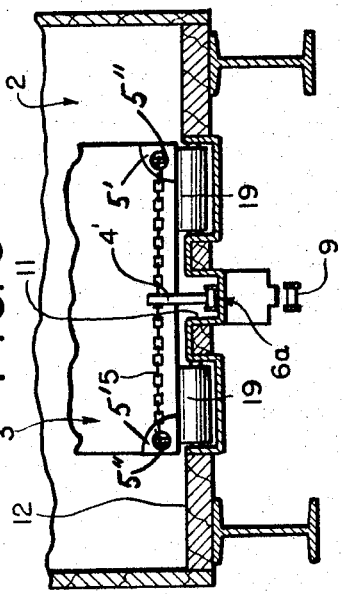
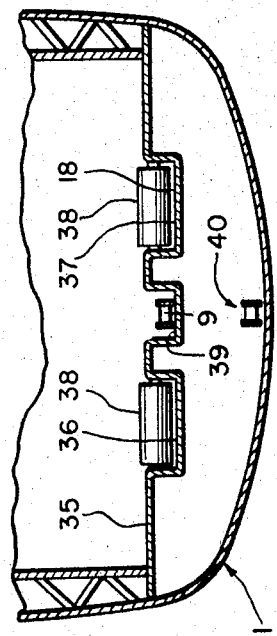

1

3,454,172
LOAD TRANSFER SYSTEM AND DEVICE THEREFOR
George W. Carr, Cincinnati, Ohio, assignor to Pullman Incorporated, Chicago, Ill., a corporation of Delaware
Filed Jan. 3, 1967, Ser. No. 607,005
Int. Cl. B65g 67/02; B60p 1/52, 1/64
U.S. Cl. 214—38                    5 Claims

ABSTRACT OF THE DISCLOSURE

A load transfer system for transferring of a container or the like from a load transfer vehicle to a transporting vehicle such as an airplane, the load transfer vehicle carrying the container on a rollered surface and by a remote control operated chain drive mechanism for coupling to a corresponding chain drive and rollered transporting vehicle or airplane wherein the operator may move with his transfer controls and the container as he walks along between the transfer vehicle and the transporting vehicle.

BACKGROUND OF THE INVENTION

Field of invention

This invention relates to means for the transferring of lading from one vehicle to another. Containerization whereby goods or lading are stored in a standard size box or container for transportation between trailers, railroad cars, airplanes and ships is becoming increasingly popular. Much time and labor can be saved if the contents carried by a particular container can remain in the container as it moves to various modes of transportation without the necessity of unpacking the material or lading and placing it in another container. In order to do this, various devices have been developed to permit ready transfer of containers from one mode of transportation to another. It is this area with which the invention is concerned.

Description of prior art

Many various types of systems and devices therefor have been developed for ready transferring of lading or containers having lading therein from one mode of transportation to another. One very popular method is to use a crane structure at the site where the transfer will take place, as for instance, between a trailer and a railroad car or between the trailer and the aircraft. This of course, requires that heavy crane equipment be provided at the exchange-of-lading site and prevents the exchange of such lading at sites where there is not such unloading equipment. It has also been provided to have a transfer vehicle placed at the unloading or transfer vehicle placed at the unloading or transfer site of the cargo van bodies or containers. Most of the types of transfer devices, however, do not provide for remote controlled transfer device for transferring of the container from the unloading vehicle to the vehicle that is accepting the container but rather a winch device is required in the transfer process. Further, when transferring from one vehicle to another it is particularly important to make sure that the transferring container does not do damage to either of the vehicles and therefore the operator must carefully watch this transfer to see that no damage occurs either to the vehicle or to the container itself. This is particularly important where you are transferring from one vehicle to another vehicle having an enclosure or walls such as to an aircraft cargo plane. It is also desired to provide for towing means between the two vehicles that will readily allow for their smooth and quick transfer. It is the purpose and objective of this invention to meet these demands and requirements as heretofore not provided by the prior art.

SUMMARY

This invention relates to improvement in systems for transferring of a container or cargo van body from one mode of transportation to another and in particular relates to the transfer of a container from a vehicle such as a trailer to a load transfer vehicle to an aircraft where there is provided rolling surfaces both on the transfer vehicle and on the floor of the aircraft and wherein there is a chain portion in each vehicle that may be couplable together and driven by a motorized unit under the control of the operator so that he may readily hook the container to the chain portion of the transfer vehicle which is coupled to the chain portion of the aircraft and then electrically operate through the medium of a motor the movement of the chain to carry the container into the aircraft and to carefully observe the movements of the container between the two vehicles so as not to damage either vehicle or container by the use of an electrical control device including a cable that is wound about a drum and moves in accordance with the movement or walking of the operator from one vehicle to the other so that he can carefully and incrementally adjust the position of the container as he moves along. Further, the invention provides for a unique chain system whereby half of the chain section may remain in the vehicle such as the transfer device when not in use and the other half remains permanently in the aircraft when not in use. These and other objects, advantages and purposes of the invention will become more readily apparent from reference to the following description, drawings and appended claims.

BRIEF DESCRIPTION OF THE DRAWINGS

FIG. 1 is a general perspective view of the invention showing the system of transferring of the container and the novel device therefor to accomplish same;

FIG. 2 is an enlarged partial view in elevation of the invention taken along line 2—2 of FIG. 1;

FIG. 3 is a cross-section taken along line 3—3 of FIG. 2;

FIG. 4 is a partial sectional view taken along line 4—4 of FIG. 2;

FIG. 5 is a partial sectional view of the novel chain arrangement of the invention; and FIG. 6 is illustrative in section of the novel coupling and uncoupling of the chain sections of the two vehicles.

DESCRIPTION OF THE PREFERRED EMBODIMENT

With reference to the drawings, there is shown a load receiving vehicle such as an airplane 1 and just rearwardly of the plane there is shown a load transfer device or vehicle 2 (which may be walled as shown or by a flat deck type) for transferring of the container 3 within the vehicle 2 (which is open at fore and aft ends) to the inside of aircraft 1. It will be appreciated that this perspective view is for illustrative purposes only and that it does not reflect a true aircraft tail section which has been omitted for purposes of clarity. The container 3 is provided with a hook means 4, 4' at front and rear ends of container 3 secured by a chain 5 to the container 3 and having a lower end with each hook portion 4a for coupling at front and rear to a chain structure 6a of chain means 6 which comprises a plurality of outer links 7 and inner links 8 held together by rollers 9 through the means of a lock or spring loaded detent 10, as seen in FIG. 5, to allow for ready assembly and disassembly of the rollers and links from one another by removing or pushing the shaft 11a, carrying the detent 10, inwardly and separating the links 7 and 8, shaft 11a and rollers 9 from one another. The chain assembly 6a extends lengthwise of the transfer vehicle in a trough (hat section) portion 11 in the floor 12 of the transfer vehicle 2 which is supported by wheel means 13, 14 and 15 and having the hollow body 16. There is provided at each set of rear and/or front corners 5' of the container an opening for receiving a container hook 5" and a tie chain 5 for each container hook to permit the central chain hook 4 or 4' on this tie 5 to couple to one of the fore and one of the aft of rollers 9 of the link chain 6a. To allow for smooth travel and pull of the container outwardly of the vehicle 2 there is also provided on the floor of the vehicle 12 a pair of troughs (hat section) 17 and 18 flanking the chain trough 11 and each carrying a plurality of longitudinally spaced rollers (which extends slightly above floor 12). An operator 20 standing in the aircraft vehicle 1 (see FIG. 1) operates a cable remote control box 21 which has stop and fore and aft movement buttons connected with an electrical cable 22 that is wrapped around a spring loaded (to wind cable 22 on the drum) drum 23 mounted in the transfer vehicle 2. The cable wind-up drum may also be operated to rotate by other means such as an electric motor. The electrical cable 22 connects with an electrical wire means 23a which is coupled to the electrical reversible motor 24 which through a gear reducer means 25 powers the sprocket 26 to operate the chain assembly 6a when it is coupled to the chain assembly in the aircraft to be later explained, to form a complete continuous chain means 6. It is to be noted that the chain assembly 6a is provided with a slack adjustment sprocket 27 pivotally mounted on the vehicle by arm 28 which has attached to it tensioning rod 29 that is threaded and driven by crank 30 through threaded support 31 on the vehicle 2 to allow the sprocket 27 to adjust the tension in the chain assembly 6a. The chain 6a is looped about sprocket 27 and has upper and lower portions.

Referring to FIG. 6 it is seen that the chain assembly 6a in the vehicle 2 has its outer ends 32 and 33 of the upper and lower portions coupled to hook means 34 and 35 which are attached to the floor structure 12 in the trough 11 of the vehicle 2.

The aircraft vehicle 1 is provided with a floor 35 having roller troughs 36 and 37 containing rollers 38 (extending slightly above floor 35) in each trough which flanks central chain bearing trough 39 for carrying the chain assembly or section 40 of chain means 6 which is same in construction as the chain assembly 6a of chain means 6 in the transfer vehicle 2. The rollers 38 and their mountings and parts and the troughs 36 and 37 of the aircraft 1 are the same in construction as in the transfer vehicle 2. It is also seen that in FIG. 6 the chain structure 40 similarly coupled to the outer open ends 41 and 42 of the aircraft 1 in a similar manner as the outer ends 32, 33 of the chain structure 6a couples to the outer end of the floor 12 of the transfer vehicle 2. For coupling of chain sections 6a and 40 together to form continuous chain means 6 the transfer vehicle 2 is moved close to the aircraft vehicle 1 and then the two chain assemblies 6a are coupled together in the manner as shown by FIG. 5 and as explained by FIG. 5 aforesaid.

The system or procedure of transferring a container 3 from the transfer vehicle 2 to the aircraft vehicle housing or inside 1a of the aircraft 1 is accomplished by parking the transfer vehicle 2 at a safe distance from the plane 1, say from half a foot to a foot and a half. This distance would assure that the plane 1 would never be touched by the transfer vehicle. When the distance is achieved the brakes are applied on the transfer vehicle 2 and of course the aricraft 1 remains stationary at the time of transfer. The two parts of the endless chain structure 6a and 40 are connected together by the quick disconnect chain links as shown in FIG. 5 with use of detent means 10. Next the endless chain is brought to the proper tension by the slack adjuster sprocket 27. Then the container 3 is hooked by means of hook means 4, 4' to the interlocked assemblies 6a and 40 and then the operator 20 operates the control cable device 21 in his hand and he proceeds along with the moving container as the power sprocket 26 rotates both chain assemblies 6a and 40 as common continuous chain means 6 about the respective sprockets 26 on the vehicle 2 and 47 on the plane 1. In this manner the operator will be able to control every inch of fore and aft movement of the container as the electrical cable 22 on the drum 23 moves out as he moves along and moves back under the spring tension as he moves back so that he can see how the container is moving along and yet he is energizing by remote control 21 the reversible motor to move sprocket 26 and chain means 6 to move the container from the transfer vehicle 2 into the aircraft 1. When the transfer is completed the chain assemblies 6a and 40 are disconnected and then the vehicles are separated from one another.

It is noted by this construction when disconnected part of the endless chain always remains on provided hooks in the transfer vehicle and part of the endless chain always remain on provided hooks in the aircraft. The spring loaded cable drum on the wall of transfer vehicle 2 is provided with enough wire to allow the operator to move between the entire lengths of both vehicles.

The foregoing description and drawings merely explain and illustrate the invention and the invention is not limited thereto, as those skilled in the art who have the disclosure before them will be able to make modifications and variations therein without departing from the scope of the invention.

What is claimed is:
1. A vehicle transfer system comprising:
a first load transfer vehicle having a first portion of an endless chain structure in its floor structure,
means for coupling said portion of the chain structure to an associated container,
means for driving said chain structure,
a second load receiving vehicle having the other portion of the endless chain structure in its floor, means for coupling said chain structure of each vehicle together,
means on each vehicle for storing each portion of the chain structure in its respective vehicle when not coupled to each other,
operable means being connected with the means for driving same chain structure of the load transfer vehicle for moving a container along each vehicle, and
said operable means for moving said container being movable by an operator in accordance with the movement of the container from one vehicle to the other,
each vehicle being provided with rolling surfaces adjacent said chain structure in the floor of each vehicle for easy movement of the container across the vehicle floor surfaces,
said operable means comprising an energized control unit and said means for driving said chain structure including motor means operated by said control unit for driving the chain structure in each vehicle,
said operable means further comprising an electrical cable windable on a retractable biased drum for moving the control unit along with the movements of the container by the motorized driven chain structure of the load transfer vehicle mechanism to move each portion of the chain structure in each vehicle when the portions of the chain structure are coupled together.

2. The invention according to claim 1, and each portion of the chain structure comprising releasably connectable link means and roller means to form together continuous chain.

3. The invention according to claim 1, and the means for coupling being hook means connectable between the associated container and said first portion of the chain structure of the load transfer vehicle.

4. The invention according to claim 1, and trough means for receiving roller means longitudinally of each vehicle for smooth movement of the container from one vehicle to the other.

5. The invention according to claim 1, and trough means for receiving each portion of the chain structure of each of said vehicles.

References Cited

UNITED STATES PATENTS

| | | | |
|---|---|---|---|
| 2,282,352 | 5/1942 | Fitch | 214—516 |
| 2,422,910 | 6/1947 | Katinos | 214—38 |
| 2,467,354 | 4/1949 | Baldwin | 214—38 |
| 2,973,073 | 2/1961 | Elliott. | |
| 3,250,408 | 5/1966 | Daniluk et al. | 214—38 |
| 3,355,040 | 11/1967 | Guttridge | 214—75 |

ROBERT G. SHERIDAN, *Primary Examiner.*

U.S. Cl. X.R.

214—516